United States Patent
Chae et al.

(10) Patent No.: US 10,745,521 B2
(45) Date of Patent: Aug. 18, 2020

(54) POLYIMIDE FILM, COMPOSITION FOR PREPARING POLYIMIDE FILM, AND DISPLAY DEVICE INCLUDING POLYIMIDE FILM

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Jungha Chae, Yongin-si (KR); Chanjae Ahn, Suwon-si (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 91 days.

(21) Appl. No.: 15/816,079

(22) Filed: Nov. 17, 2017

(65) Prior Publication Data
US 2018/0148543 A1 May 31, 2018

(30) Foreign Application Priority Data
Nov. 25, 2016 (KR) ........................ 10-2016-0158516

(51) Int. Cl.
*C08G 73/14* (2006.01)
*C08J 5/18* (2006.01)

(52) U.S. Cl.
CPC ............... *C08G 73/14* (2013.01); *C08J 5/18* (2013.01); *C08J 2379/08* (2013.01)

(58) Field of Classification Search
None
See application file for complete search history.

(56) References Cited

U.S. PATENT DOCUMENTS

| | | | |
|---|---|---|---|
| 9,018,343 B2 | 4/2015 | Park et al. | |
| 9,580,555 B2 | 2/2017 | Ju et al. | |
| 9,706,649 B2 | 7/2017 | Jung et al. | |
| 2016/0222249 A1* | 8/2016 | Choi | C09D 179/08 |

FOREIGN PATENT DOCUMENTS

| | | |
|---|---|---|
| KR | 2013-0035691 A | 4/2013 |
| KR | 2013-0074167 A | 7/2013 |
| KR | 2015-0076114 A | 7/2015 |

* cited by examiner

*Primary Examiner* — Ana L. Woodward
(74) *Attorney, Agent, or Firm* — Cantor Colburn LLP

(57) ABSTRACT

A polyimide film having tensile modulus of greater than or equal to about 5 gigapascals, and yellowness index of less than 2.5, when measured at a thickness of the film between 50 micrometers to 100 micrometers, wherein the polyimide film is a reaction product of a combination including an aromatic dianhydride and an aromatic diamine, wherein the aromatic dianhydride includes 4,4'-oxydiphthalic anhydride.

11 Claims, No Drawings

POLYIMIDE FILM, COMPOSITION FOR PREPARING POLYIMIDE FILM, AND DISPLAY DEVICE INCLUDING POLYIMIDE FILM

CROSS-REFERENCE TO RELATED APPLICATION

This application claims priority to Korean Patent Application No. 10-2016-0158516, filed on Nov. 25, 2016, and all the benefits accruing therefrom under 35 U.S.C. § 119, the content of which is incorporated herein in its entirety by reference.

BACKGROUND

1. Field

This disclosure relates to a polyimide film, a composition for preparing a polyimide film, and to a display device including a polyimide film.

2. Description of the Related Art

A flexible display, which is not restricted by time and place, that is thin and flexible like paper, ultra light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must have high hardness and excellent optical properties. Hardness may be supplemented by a hard coating layer, however, a base film having high tensile modulus also renders a final film having high hardness. Desired optical properties include high light transmittance, low haze, low yellowness index, low YI difference after exposure to UV light, and the like.

However, there remains a need for polymers having excellent optical and mechanical properties.

SUMMARY

An embodiment provides a polyimide film having improved optical and mechanical properties.

Another embodiment provides a composition for preparing a polyimide film.

Still another embodiment provides a display device including a polyimide film.

According to an embodiment, provided is a polyimide film having tensile modulus of greater than or equal to about 5 gigapascals, and yellowness index of less than 2.5 when measured at a thickness of the film between 50 micrometers to 100 micrometers, wherein the polyimide film is a reaction product of a combination including an aromatic dianhydride and an aromatic diamine, wherein the aromatic dianhydride includes 4,4'-oxydiphthalic anhydride.

The aromatic dianhydride is represented by Chemical Formula 1, and the aromatic diamine is represented by Chemical Formula 2:

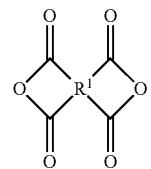

Chemical Formula 1

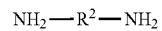

Chemical Formula 2 wherein, in Chemical Formula 1 and Chemical Formula 2,
$R^1$ and $R^2$ each independently include a substituted or unsubstituted C6 to C30 aromatic organic group, wherein the C6 to C30 aromatic organic group includes one aromatic ring, two or more aromatic rings fused together to provide a condensed ring system, or two or more aromatic moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof.

The polyimide film may be a reaction product of the combination that further includes an aromatic dicarbonyl compound represented by Chemical Formula 3:

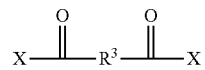

Chemical Formula 3 wherein, in Chemical Formula 3,
$R^3$ is a substituted or unsubstituted phenylene or biphenylene group, and X is a halogen atom.

In Chemical Formula 1, $R^1$ may include two or more aromatic moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, and a combination thereof.

Chemical Formula 1 may be represented by Chemical Formula 4:

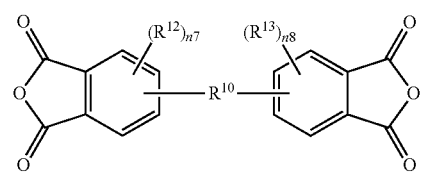

Chemical Formula 4 wherein, in Chemical Formula 4,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, hydroxy group, a substituted or unsubstituted C1 to C10 aliphatic organic group, a C6 to C20 aromatic organic group, an alkoxy group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, n7 and n8 are each independently an integer ranging from 0 to 3.

The compound represented by Chemical Formula 4 may be a combination of the compound represented by Chemical Formula 4 wherein $R^{10}$ is —O—, and both n7 and n8 are 0, and the compound represented by Chemical Formula 4 wherein $R^{10}$ is —$C(C_nF_{2n+1})_2$— wherein $1 \leq n \leq 10$, and both n7 and n8 are 0.

The compound represented by Chemical Formula 4, which is a combination of the above, may further include the compound represented by Chemical Formula 4 wherein $R^{10}$ is a single bond, and both n7 and n8 are 0.

In Chemical Formula 2, $R^2$ may include substituted or unsubstituted two or more aromatic moieties linked through a single bond or through a functional group selected from —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq n \leq 10$, —C(CH$_3$)$_2$—, —C(CF$_3$)$_2$—, —C(=O)NH—, and a combination thereof, wherein the two or more aromatic moieties may be substituted with at least one selected from —OH, —CF$_3$, —CCl$_3$, —CBr$_3$, —C$_{13}$, —NO$_2$, —CN, —COCH$_3$ and —CO$_2$C$_2$H$_5$.

In Chemical Formula 2, $R^2$ may include two or more phenylene groups linked through a single bond, wherein each of the two or more phenylene groups are substituted by at least one selected from —CF$_3$, —CCl$_3$, —CBr$_3$, —Cl$_3$, —NO$_2$, —CN, —COCH$_3$ and —CO$_2$C$_2$H$_5$.

In Chemical Formula 3, $R^3$ may be phenylene group, and X may be Cl.

The polyimide film may be a reaction product of a combination including the aromatic dicarbonyl compound represented by Chemical Formula 3 in an amount of 51 mole percent to 70 mole percent based on the total amount of the aromatic dianhydride and the aromatic dicarbonyl compound.

The polyimide film may be a reaction product of a combination including 4,4'-oxydiphthalic anhydride in an amount of 1 mole percent to 35 mole percent based on the total amount of the aromatic dianhydride and the aromatic dicarbonyl compound represented by Chemical Formula 3.

The polyimide film may be a reaction product of a combination including 2,2-bis-(3,4-dicarboxyphenyl) hexafluoropropane dianhydride) in an amount of 10 mole percent to 30 mole percent based on the total amount of the aromatic dianhydride and the aromatic dicarbonyl compound represented by Chemical Formula 3.

According to an embodiment, provided is a composition for preparing a polyimide film including an amide structural unit-containing diamine represented by Chemical Formula 5, and an aromatic dianhydride represented by Chemical Formula 4:

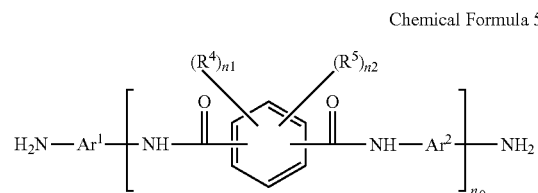

Chemical Formula 5 wherein, in Chemical Formula 5,
$R^4$ and $R^5$ are each independently a halogen, hydroxy group, a substituted or unsubstituted C1 to C10 alkyl group, or a substituted or unsubstituted C1 to C10 alkoxy group,
n0 is an integer greater than or equal to 1,
n1 and n2 are each independently an integer ranging from 0 to 4, provided that n1+n2 is an integer ranging from 0 to 4, and
$Ar^1$ and $Ar^2$ are each independently represented by Chemical Formula 6:

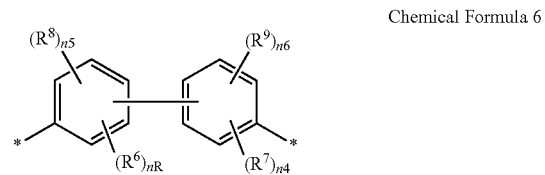

Chemical Formula 6 wherein, in Chemical Formula 6,
$R^6$ and $R^7$ are each independently an electron withdrawing group selected from —CF$_3$, —CCl$_3$, —CBr$_3$, —Cl$_3$, —NO$_2$, —CN, —C(=O)CH$_3$, and —CO$_2$C$_2$H$_5$,
$R^8$ and $R^9$ are each independently a halogen, hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein $R^{205}$, $R^{206}$, and $R^{207}$ are each independently hydrogen or a C1 to C10 aliphatic organic group,
n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4; and

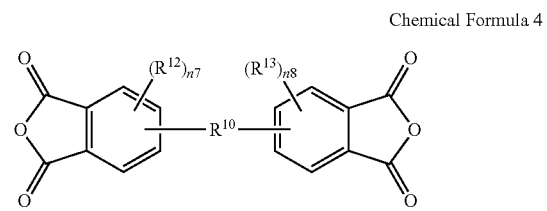

Chemical Formula 4 wherein, in Chemical Formula 4,
$R^{10}$ is a single bond, —O—, —S—, —O(=O)—, —CH(OH)—, —C(=O)NH—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$ C(C$_n$F$_{2n+1}$)$_2$(CH$_2$)$_q$— wherein $1 \leq n \leq 10$, $1 \leq p \leq 10$, and $1 \leq q \leq 10$, $R^{12}$ and $R^{13}$ are each independently a halogen, hydroxy group, a substituted or unsubstituted C1 to C10 aliphatic organic group, a C6 to C20 aromatic organic group, an alkoxy group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further include a diamine represented by Chemical Formula 7:

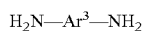  Chemical Formula 7 wherein, in Chemical Formula 7, $Ar^3$ is represented by Chemical Formula 6.

The compound represented by Chemical Formula 4 may be a combination of the compound wherein $R^{10}$ is —O—, and both n7 and n8 are 0, and the compound wherein $R^{10}$ is —$C(C_nF_{2n+1})_2$— wherein $1 \leq n \leq 10$, and both n7 and n8 are 0.

The compound represented by Chemical Formula 4, which is a combination of the above, may further include the compound wherein $R^{10}$ is a single bond, and both n7 and n8 are 0.

The composition may include the amide structural unit represented by n0 in the compound represented by Chemical Formula 5 in an amount of 51 mole percent to 70 mole percent based on the total mole number of the amide structural unit and the aromatic dianhydride represented by Chemical Formula 4.

The compound represented by Chemical Formula 4 may include 4,4'-oxydiphthalic anhydride in an amount of 1 mole percent to 35 mole percent based on the total mole number of the amide structural unit represented by n0 in the compound represented by Chemical Formula 5 and the aromatic dianhydride.

The compound represented by Chemical Formula 4 may include 2,2-bis-(3,4-dicarboxyphenyl)hexafluoropropane dianhydride in an amount of 10 mole percent to 30 mole percent based on the total mole number of the amide structural unit represented by n0 in the compound represented by Chemical Formula 5 and the aromatic dianhydride.

According to another embodiment, provided is a display device including a polyimide film according to an embodiment.

A polyimide film according to an embodiment may have improved optical properties, such as, yellowness index, while maintaining excellent mechanical properties, and may be used as a window film in a display device, such as, for example, a flexible display device.

Hereinafter, further embodiments will be described in detail.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), hydroxyl group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "ester group" refers to a C2 to C30 ester group, for example, a C2 to C18 ester group, the term "ketone group" refers to a C2 to C30 ketone group, for example, a C2 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, for example, a C2 to C18 alkynyl group, the term "alkylene group" refers to a C1 to C30 alkylene group, for example, a C1 to C18 alkylene group, and the term "arylene group" refers to a C6 to C30 arylene group, for example, a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, for example, through —S(=O)$_2$—, for example an aryl group or a C6 to C30 arylene group, for example, a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

As used herein, when a definition is not otherwise provided, "polyimide" may refer to not only "polyimide", but also "polyamic acid" or a combination of "polyimide" and "polyamic acid". Further, the terms "polyimide" and "polyamic acid" may be understood as the same material.

In addition, in the specification, the mark "*" may refer to a point of attachment to another atom.

Research efforts towards converting mobile devices, such as, a mobile phone or a tablet personal computer, and the like, to light, flexible, and bendable devices are currently ongoing. In this regard, a flexible and transparent window film for a display device having high hardness for replacing a rigid glass placed on top of the mobile devices is desired.

To be used as a window film, high hardness and good optical properties are desired. Hardness may be supplemented with a hard coating layer, but a base film having high tensile modulus may ensure that a final film has high hardness. Desired optical properties include high light transmittance, low haze, low yellowness index, and the like.

A polyimide or poly(imide-aramide) copolymer has excellent mechanical, thermal, and optical properties, and thus is widely used as a plastic substrate for a display device, such as an organic light emitting device (OLED), liquid crystal device (LCD), and the like. In order to use polyimide or poly(imide-amide) film as a window film for a flexible display device, however, further improved mechanical and optical properties, such as, high hardness (or modulus), high transmittance, low yellowness index, and the like, are desired. It is difficult, however, to improve both mechanical and optical properties of the film at the same time, as the modulus and yellowness index of a polyimide or poly (imide-amide) film are in a trade-off relationship with regard to each other.

Meanwhile, in an effort to improve mechanical properties of a poly(imide-amide) copolymer film, researches prepared a poly(imide-amide) copolymer by increasing the amount of an amide structural unit, or by including a dianhydride having a more rigid structure. In this case, however, tensile modulus is hardly improved, while optical properties, such as YI, are deteriorated.

The inventors of the subject matter of the present application have developed a polyimide-based film having improved optical properties, such as, for example, yellowness index, while maintaining good mechanical properties thereof, and found a new polyimide-based film having tensile modulus of greater than or equal to about 5 gigapascals, and yellowness index of less than 2.5 when measured at a thickness of from 50 micrometers (μm) to 100 μm, which is a reaction product of an aromatic dianhydride and an aromatic diamine, wherein the aromatic dianhydride includes 4,4'-oxydiphthalic anhydride (ODPA).

Accordingly, exemplary embodiments provide a polyimide-based film having tensile modulus of greater than or equal to about 5 gigapascals, and yellowness index of less than 2.5 when measured at a thickness of the film between 50 μm to 100 μm, wherein the polyimide-based film is a reaction product of a mixture including an aromatic dianhydride and an aromatic diamine, wherein the aromatic dianhydride includes 4,4'-oxydiphthalic anhydride (ODPA).

The aromatic dianhydride may be represented by Chemical Formula 1, and the aromatic diamine may be represented by Chemical Formula 2:

Chemical Formula 1

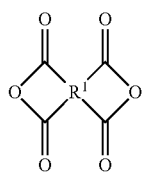

Chemical Formula 2

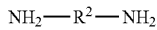

NH$_2$—R$^2$—NH$_2$ wherein, in Chemical Formula 1 and Chemical Formula 2, R$^1$ and R$^2$ each independently include a substituted or unsubstituted C6 to C30 aromatic organic group, wherein the C6 to C30 aromatic organic group includes one aromatic ring, two or more aromatic rings fused together to provide a condensed ring system, or two or more aromatic moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤p≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof.

In Chemical Formula 1, R$^1$ may include two or more aromatic moieties linked through a single bond or through a functional group selected from a fluorenylene group, —O—, —S—, —C(=O)—, —CH(OH)—, —S(=O)$_2$—, —Si (CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O) NH—, and a combination thereof.

For example, Chemical Formula 1 may be represented by Chemical Formula 4:

Chemical Formula 4

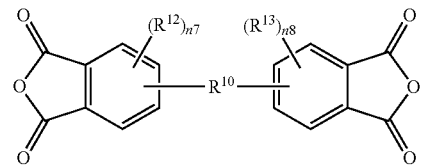

wherein, in Chemical Formula 4,

R$^{10}$ is a single bond, —O—, —S—, —C(=O)—, —CH (OH)—, —C(=O)NH—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, —(CH$_2$)$_p$ C(C$_n$H$_{2n+1}$)$_2$ (CH$_2$)$_q$—, or —(CH$_2$)$_p$ C(C$_n$F$_{2n+1}$)$_2$(CH$_2$)$_q$— wherein 1≤n≤10, 1≤p≤10, and 1≤q≤10, R$^{12}$ and R$^{13}$ are each independently a halogen, hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3.

The compound represented by Chemical Formula 4 may be a combination of the compound represented by Chemical Formula 4 wherein R$^{10}$ is —O—, and both n7 and n8 are 0, and the compound represented by Chemical Formula 4 wherein R$^{10}$ is —C(C$_n$F$_{2n+1}$)$_2$— wherein 1≤n≤10, and both n7 and n8 are 0.

In an exemplary embodiment, the compound represented by Chemical Formula 4 may be a combination of ODPA and 2,2-bis-(3,4-dicarboxyphenyl)hexafluoropropane dianhydride (6FDA).

Further, the compound represented by Chemical Formula 4, which is a combination of the above, may further include the compound represented by Chemical Formula 4 wherein R$^{10}$ is a single bond, and both n7 and n8 are 0, i.e., 3,3',4,4'-biphenyltetracarboxylic dianhydride: (BPDA).

In Chemical Formula 2, R$^2$ may include substituted or unsubstituted two or more aromatic moieties linked through a single bond or a functional group selected from —O—, —S—, —C(=O)—, —CH(OH)—, —S(=O)$_2$—, —Si (CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O) NH—, and a combination thereof, wherein the two or more aromatic moieties may be substituted with at least one selected from —OH, —CF$_3$, —CCl$_3$, —CBr$_3$, —Cl$_3$, —NO$_2$, —CN, —COCH$_3$ and —CO$_2$C$_2$H$_5$.

In Chemical Formula 2, R$^2$ may include two or more phenylene groups linked through a single bond, wherein each of the two or more phenylene groups are substituted by at least one selected from —CF$_3$, —CCl$_3$, —CBr$_3$, —Cl$_3$, —NO$_2$, —CN, —COCH$_3$ and —CO$_2$C$_2$H$_5$.

In Chemical Formula 2, R$^2$ may include two phenylene groups linked through a single bond, wherein each of the two phenylene groups are substituted by —CF$_3$.

The polyimide-based film may be a reaction product of the mixture that further includes an aromatic dicarbonyl compound represented by Chemical Formula 3:

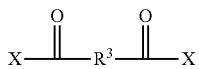

Chemical Formula 3 wherein, in Chemical Formula 3,

R$^3$ is a substituted or unsubstituted phenylene or biphenylene group, and X is a halogen atom.

In Chemical Formula 3, R$^3$ may be phenylene or biphenylene group, and X may be Cl, and the compound represented by Chemical Formula 3 may be terephthaloic dichloride (TPCI) or biphenyl dicarbonyl chloride (BPCI).

In exemplary embodiments, the compound represented by Chemical Formula 3 may be TPCI.

In exemplary embodiments, the polyimide-based film may be a reaction product of 2,2'-bis(trifluoromethyl)benzidine (TFDB) as an aromatic diamine, a mixture of 6FDA and OPDA as an aromatic dianhydride, and TPCI as an aromatic dicarbonyl compound.

The polyimide-based film may be a reaction product of a mixture including the aromatic dicarbonyl compound represented by Chemical Formula 3 in an amount of 51 mole percent (mol %) to 70 mol %, for example, 55 mol % to 70 mol %, for example, 60 mol % to 70 mol %, based on the total amount of the aromatic dianhydride and the aromatic dicarbonyl compound. By including the aromatic dicarbonyl compound represented by Chemical Formula 3 in the above range of amount, the polyimide-based film may maintain good mechanical properties, such as, tensile modulus.

The polyimide-based film may be a reaction product of a mixture including ODPA in an amount of 1 mol % to 35 mol %, for example, 1 mol % to 30 mol %, for example, 1 mol % to 25 mol %, for example, 1 mol % to 20 mol %, for example, 1.5 mol % to 20 mol %, based on the total amount of the aromatic dianhydride and the aromatic dicarbonyl compound represented by Chemical Formula 3. By including ODPA in the above range of amount, the polyimide-based film may further improve optical properties, such as, yellowness index, while maintaining good mechanical properties, such as, tensile modulus.

The polyimide-based film may be a reaction product of a mixture including 6FDA in an amount of 10 mol % to 30 mol %, for example, 10 mol % to 25 mol %, for example, 10 mol % to 23 mol %, for example, 10 mol % to 22 mol %, based on the total amount of the aromatic dianhydride and the aromatic dicarbonyl compound represented by Chemical Formula 3. By including 6FDA in the above range of amount, the polyimide-based film may further improve optical properties, such as, yellowness index, while maintaining good mechanical properties, such as, tensile modulus.

According to another embodiment, provided is a composition for preparing a polyimide-based film including an amide structural unit-containing diamine represented by Chemical Formula 5, and an aromatic dianhydride represented by Chemical Formula 4:

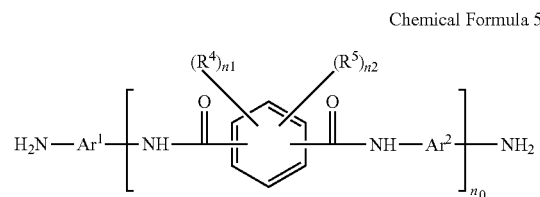

Chemical Formula 5 wherein, in Chemical Formula 5,

R$^4$ and R$^5$ are each independently a halogen, hydroxy group, a substituted or unsubstituted C1 to C10 alkyl group, or a substituted or unsubstituted C1 to C10 alkoxy group, n0 is an integer greater than or equal to 1, n1 and n2 are each independently an integer ranging from 0 to 4, provided that n1+n2 is an integer ranging from 0 to 4, and Ar$^1$ and Ar$^2$ are each independently represented by Chemical Formula 6:

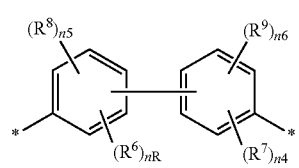

Chemical Formula 6 wherein, in Chemical Formula 6,

R$^6$ and R$^7$ are each independently an electron withdrawing group selected from —CF$_3$, —CCl$_3$, —CBr$_3$, —Cl$_3$, —NO$_2$, —CN, —C(=O)CH$_3$, and —CO$_2$C$_2$H$_5$, R$^8$ and R$^9$ are each independently a halogen, hydroxy group, a substituted or unsubstituted C1 to C10 aliphatic organic group, a C6 to C20 aromatic organic group, an alkoxy group of formula —OR$^{204}$, wherein R$^{204}$ is a C1 to C10 aliphatic organic group, or a silyl group of formula —SiR$^{205}$R$^{206}$R$^{207}$ wherein R$^{205}$, R$^{206}$, and R$^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4; and

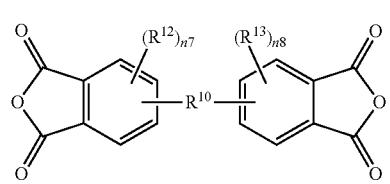

Chemical Formula 4 wherein, in Chemical Formula 4,

R$^{10}$ is a single bond, —O—, —S—, —C(=O)—, —CH(OH)—, —C(=O)NH—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, hydroxy group, a substituted or unsubstituted C1 to C10 aliphatic organic group, a C6 to C20 aromatic organic group, an alkoxy group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further include a diamine represented by Chemical Formula 7:

$$H_2N-Ar^3-NH_2 \qquad \text{Chemical Formula 7}$$

wherein, in Chemical Formula 7, $Ar^3$ is represented by Chemical Formula 6.

The compound represented by Chemical Formula 4 may be a combination of the compound wherein $R^{10}$ is —O—, and both n7 and n8 are 0, and the compound wherein $R^{10}$ is —$C(C_nF_{2n+1})_2$— wherein $1 \leq n \leq 10$, and both n7 and n8 are 0).

The compound represented by Chemical Formula 4 may be a combination of ODPA and 6FDA.

The compound represented by Chemical Formula 4, which is a combination of the above, may further include the compound wherein $R^{10}$ is a single bond, and both n7 and n8 are 0, i.e., BPDA.

The composition may include the amide structural unit represented by n0 in the compound represented by Chemical Formula 5 in an amount of 51 mol % to 70 mol %, for example, 55 mol % to 70 mol %, for example, 60 mol % to 70 mol %, based on the total mole number of the amide structural unit and the aromatic dianhydride represented by Chemical Formula 4. By including the amide structural unit represented by n0 in the compound represented by Chemical Formula 5, the polyimide-based film maintain good mechanical properties, such as, tensile modulus.

The compound represented by Chemical Formula 4 may include ODPA in an amount of 1 mol % to 35 mol %, for example, 1 mol % to 30 mol %, for example, 1 mol % to 25 mol %, for example, 1 mol % to 20 mol %, for example, 1.5 mol % to 20 mol %, based on the total mole number of the amide structural unit represented by n0 in the compound represented by Chemical Formula 5 and the aromatic dianhydride. By including ODPA in the above range of amount, the polyimide-based film may further improve optical properties, such as, yellowness index, while maintaining good mechanical properties, such as, tensile modulus.

The compound represented by Chemical Formula 4 may include 6FDA in an amount of 10 mol % to 30 mol %, for example, 10 mol % to 25 mol %, for example, 10 mol % to 23 mol %, for example, 10 mol % to 22 mol %, based on the total mole number of the amide structural unit represented by n0 in the compound represented by Chemical Formula 5 and the aromatic dianhydride. By including 6FDA in the above range of amount, the polyimide-based film may further improve optical properties, such as, yellowness index, while maintaining good mechanical properties, such as, tensile modulus.

The polyimide-based film, for example, a poly(imide-amide) copolymer film, according to an embodiment may be prepared by using a known method of polymerizing the aromatic diamine, and a mixture of the aromatic dianhydride and the aromatic dicarbonyl compound, in a mole ratio of about 1:1. However, by using a composition including the diamine represented by Chemical Formula 5, which includes amide structural unit and has a structure of an oligomer, and the compound represented by Chemical Formula 4, the poly(imide-amide) copolymer according to an embodiment may be prepared in a higher yield, without implementing the tedious precipitation process. The new method will be explained in detail as below.

In a conventional method of preparing a poly(imide-amide) copolymer, an amide structural unit may first be prepared by a reaction of a diacyl halide, such as, a dicarboxylic acid dichloride, and a diamine, and then an additional diamine and a dianhydride compound are added to the reactor to prepare an amic acid structural unit, as well as a poly(imide-amide) copolymer by linking the amide structural unit and the amic acid structural unit. Meanwhile, in the process of preparing the amide structural unit, there is a problem that a by-product, such as, a halogenated hydrogen (HX: 'H' indicates hydrogen, and 'X' indicates halogen), for example, hydrogen chloride (HCl), is produced. The hydrogen chloride by-product causes corrosion of an element of an apparatus, and thus, should necessarily be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration of optical properties of the produced film occurs. Therefore, a precipitation process to remove the salt of HX is required in the conventional method for preparing poly (imide-amide) copolymer. The precipitation process increases total process time and cost, while reducing the yield of the final poly(imide-amide) copolymer produced therefrom.

Reaction Scheme 1

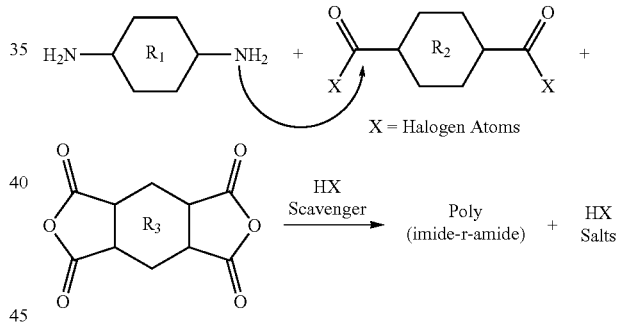

On the contrary, as described above, by using a composition including an aromatic dianhydride and an aromatic diamine including an amide structural unit and having an oligomer structure, it is possible to omit the precipitation process for removing the HX salt, and thus, not only the total process time and cost may be reduced, but also the yield of the final poly(imide-amide) copolymer may increase. Further, it is possible to obtain a poly(imide-amide) copolymer including a higher amount of an amide structural unit than those prepared by using a conventional method, and thus, an article prepared from the poly(imide-amide) copolymer, for example, a film, may further improve mechanical properties, while maintaining good optical properties.

Meanwhile, the amide structural unit-containing diamine, which has a structure of an oligomer and which is represented by Chemical Formula 5, may be prepared by using a known method of reacting a diamine and a dicarbonyl derivative, for example, a known method for preparing a polyamide, such as, low temperature solution polymerization, interface polymerization, fusion polymerization, solid-phase polymerization, and the like. For example, the low temperature solution polymerization may be performed by reacting a diamine, which forms the amide structural unit, and a diacyl halide compound in an aprotic polar solvent, provided that the diamine is used in an amount of greater than the diacyl halide compound, such that both ends of the prepared diamine have amino groups. The obtained amide structural unit-containing diamine may be used as a diamine monomer and react with a dianhydride represented by Chemical Formula 4, providing a poly(imide-amide) copolymer that includes an amide structural unit and an imide structural unit.

Therefore, the composition according to an embodiment may provide a polyimide-based film having good mechanical properties by increasing the amount of the amide structural unit, while not requiring the tedious precipitation process for removing HCl, the by-product of a process for preparing an amide structural unit.

After preparing a poly(imide-amide) copolymer from the composition, an article may be formed from the poly(imide-amide) copolymer through a dry-wet method, a dry method, or a wet method, but is not limited thereto. When the article is a film, it may be manufactured using a solution including the composition through the dry-wet method, wherein a layer is formed by extruding the solution of the composition from a mouth piece on a supporter, such as drum or an endless belt, drying the layer, and evaporating the solvent from the layer until the layer has a self-maintenance property. The drying may be performed by heating, for example, from about 25° C. to about 150° C., within about 1 hour or less. Then, the dried layer may be heated from about 250° C. to about 300° C. from about 5 to about 30 minutes, at a heating rate of about 10° C. per minute, to obtain a polyimide-based film.

When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated. The heat treatment may be performed at about 200° C. to about 500° C., for example, at about 250° C. to about 400° C., for several seconds to several minutes. After the heat treatment, the layer may be cooled slowly, for example, at a cooling rate of less than or equal to about 50° C. per minute.

The layer may be formed as a single layer or multiple layers.

The article may be a film, and the film may have yellowness index (YI) of less than about 2.5 at a thickness of about 50 micrometers (μm) according to an ASTM D1925 method.

The article may be a film, and the film may have tensile modulus of greater than or equal to about 5.0 gigapascals (GPa), at a thickness of about 50 μm according to an ASTM D882 method.

That is, the article may maintain excellent mechanical properties of the polyimide or poly(imide-amide) copolymer, for example, high tensile modulus, while having improved optical properties, for example, low yellowness index (YI).

According to another embodiment, provided is a display device including a polyimide-based film according to an embodiment.

As described above, the film may have improved optical properties, for example, low yellowness index, while maintaining excellent mechanical properties, and thus, can be used as a window film for a display device, for example, a flexible display device.

Hereafter, the technology of this disclosure is described in detail with reference to examples. The following examples and comparative examples are not restrictive but are illustrative only.

EXAMPLES

Synthesis Example 1: Preparation of an Oligomer Containing 70 Mol % of an Amide Structural Unit as a Diamine Monomer An amide structural unit-containing oligomer, as a diamine monomer, is prepared by reacting TPCI and 2,2'-bis(trifluoromethyl)benzidine (TFDB), in accordance with Reaction Scheme 2:

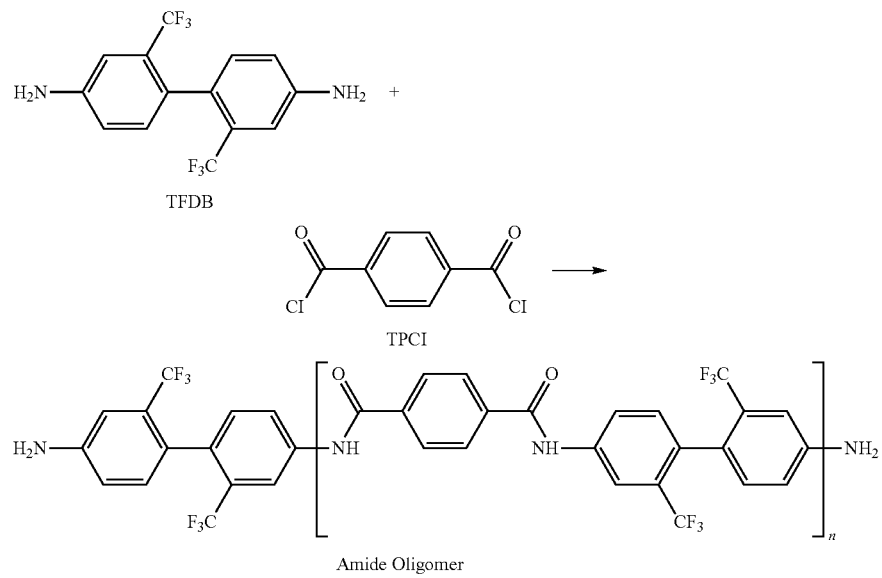

That is, 1 mole equivalent (0.122 mole, 39.2 grams) of 2,2'-bis(trifluoromethyl)benzidine (TFDB) and 2.8 mole equivalent (0.343 mole, 27.11 grams, g) of pyridine are dissolved in 700 g of N,N-dimethyl acetamide (DMAc) as a solvent in a round-bottomed flask, and 50 milliliters of DMAC is further added to the flask to dissolve the remaining TFDB. Then, 0.7 mole equivalent (0.086 mole, 17.4 g) of terephthaloyl chloride (TPCl) is divided into 4 portions, which are individually added, each portion at a time, to be mixed with the TFDB solution. The mixture is then vigorously stirred and reacted for 15 minutes at room temperature.

The resultant solution is further stirred under a nitrogen atmosphere for 2 hours, and then added to 7 liters of water containing 350 g of NaCl. Then, the mixture is stirred for 10 minutes. Subsequently, a solid produced therein is filtered, re-suspended twice, and then re-filtered by using 5 liters (L) of deionized water. Then, the water remaining in the final product on the filter is removed as much as possible by thoroughly pressing the filtered precipitate on a filter. The precipitate is then dried at 90° C. under vacuum for 48 hours, to obtain an amide structural unit-containing oligomer represented in Reaction Scheme 2, as a diamine monomer, as a final product. The prepared oligomer containing 70 mol % of amide structural unit has a number average molecular weight of about 997 grams per mole (gram/mole).

EXAMPLES AND COMPARATIVE EXAMPLE: PREPARATION OF POLY(IMIDE-AMIDE) COPOLYMER FILMS

Example 1

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 18.93 grams (0.0134 moles) of the 70 mol % of amide structural unit-containing oligomer prepared in Synthesis Example 1 is added thereto and dissolved. Then, 0.2 grams (0.007 moles) of ODPA, 1.58 grams (0.0054 moles) of 3,3',4,4'-biphenyltetracarboxylic dianhydride (BPDA), and 3.28 grams (0.0074 moles) of 2,2-bis-(3,4-dicarboxyphenyl)hexafluoropropane dianhydride) (6FDA) are added to the solution, and the mixture is stirred for 48 hours at 25° C. Then, 1.59 grams of pyridine and 4.11 grams of acetic anhydride are added thereto, and the mixture is stirred for 24 hours to obtain a poly(amic acid-amide) copolymer solution, of which the solid content is 16 weight %.

After cooling the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Example 2

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 18.93 grams (0.0134 moles) of the 70 mol % of amide structural unit-containing oligomer prepared in Synthesis Example 1 is added thereto and dissolved. Then, 0.41 grams (0.0013 moles) of ODPA, 1.38 grams (0.0047 moles) of 3,3',4,4'-biphenyltetracarboxylic dianhydride (BPDA), and 3.27 grams (0.0074 moles) of 2,2-bis-(3,4-dicarboxyphenyl)hexafluoropropane dianhydride) (6FDA) are added to the solution, and the mixture is stirred for 48 hours at 25° C. Then, 1.59 grams of pyridine and 4.11 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Example 3

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 18.47 grams (0.013 moles) of the 70 mol % of amide structural unit-containing oligomer prepared in Synthesis Example 1 is added thereto and dissolved. Then, 1.21 grams (0.0039 moles) of ODPA, 0.57 grams (0.002 moles) of 3,3',4,4'-biphenyltetracarboxylic dianhydride (BPDA), and 3.19 grams (0.0072 moles) of 2,2-bis-(3,4-dicarboxyphenyl)hexafluoropropane dianhydride) (6FDA) are added to the solution, and the mixture is stirred for 48 hours at 25° C. Then, 1.55 grams of pyridine and 4.0 grams of acetic anhydride are added thereto, and the mixture is stirred for 24 hours to obtain a poly(amic acid-amide) copolymer solution, of which the solid content is 16 percent by weight (weight %).

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Example 4

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 18.18 grams (0.0129 moles) of the 70 mol % of amide structural unit-containing oligomer prepared in Synthesis Example 1 is added thereto and dissolved. Then, 1.8 grams (0.0058 moles) of ODPA and 3.15 grams (0.0071 moles) of 2,2-bis-(3,4-dicarboxyphenyl) hexafluoropropane dianhydride) (6FDA) are added to the solution, and the mixture is stirred for 48 hours at 25° C. Then, 1.53 grams of pyridine and 3.94 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Example 5

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 19.7 grams (0.0133 moles) of the 70 mol % of amide structural unit-containing oligomer prepared in Synthesis Example 1 is added thereto and dissolved. Then, 2.97 grams (0.0096 moles) of ODPA, and 4.94 grams (0.011 moles) of 2,2-bis-(3,4-dicarboxyphenyl)hexafluoropropane dianhydride) (6FDA) are added to the solution, and the mixture is stirred for 48 hours at 25° C. Then, 1.64 grams of pyridine and 6.35 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Comparative Example 1

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 11.42 grams (0.0077 moles) of the 70 mol % of amide structural unit-containing oligomer prepared in Synthesis Example 1 and 4.58 grams (0.014 moles) of TFDB are added thereto and dissolved. Then, 4.16 grams (0.013 moles) of ODPA, and 3.82 grams (0.008 moles) of 2,2-bis-(3,4-dicarboxyphenyl)hexafluoropropane dianhydride) (6FDA) are added to the solution, and the mixture is stirred for 48 hours at 25° C. Then, 2.62 grams of pyridine and 6.75 grams of acetic anhydride are added thereto, and the mixture is stirred for 24 hours to obtain a poly(amic acid-amide) copolymer solution, of which the solid content is 20 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Comparative Example 2

124.1 grams of N,N-dimethyl acetamide (DMAc) as a solvent is charged into a 4-neck double-walled 250 mL reactor, pre-heated to 25° C., and equipped with a mechanical stirrer and a nitrogen inlet, and 14 grams (0.043 moles) of TFDB, 5.19 grams (0.065 moles) of pyridine, and 6.66 grams (0.032 moles) of TPCI are added thereto and dissolved. Then, 2.03 grams (0.006 moles) of ODPA, and 1.94 grams (0.004 moles) of 2,2-bis-(3,4-dicarboxyphenyl) hexafluoropropane dianhydride) (6FDA) are added to the solution, and the mixture is stirred for 48 hours at 25° C. Then, 5.19 grams of pyridine and 13.39 grams of acetic anhydride are added thereto, and the mixture is stirred for 24 hours to obtain a poly(amic acid-amide) copolymer solution, of which the solid content is 16 weight %. Then, the solution is treated with excessive amount of water to cause precipitation, and the precipitated solid is washed with ethanol, and dried to obtain powder, which is re-dissolved in N,N-dimethylacetamide (DMAc) to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Comparative Example 3

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 18.93 grams (0.0134 moles) of the 70 mol % of amide structural unit-containing oligomer prepared in Synthesis Example 1 is added thereto and dissolved. Then, 1.77 grams (0.006 moles) of 3,3',4,4'-biphenyltetracarboxylic dianhydride (BPDA), and 3.28 grams (0.0074 moles) of 2,2-bis-(3,4-dicarboxyphenyl) hexafluoropropane dianhydride) (6FDA) are added to the solution, and the mixture is stirred for 48 hours at 25° C. Then, 1.59 grams of pyridine and 4.11 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Comparative Example 4

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 11.9 grams (0.0082 moles) of the 70 mol % of amide structural unit-containing oligomer prepared in Synthesis Example 1 and 2.83 grams (0.008 moles) of TFDB are added thereto and dissolved. Then, 4.18 grams (0.013 moles) of ODPA, and 5.07 grams (0.011 moles) of 2,2-bis-(3,4-dicarboxyphenyl)hexafluoropropane dianhydride) (6FDA) are added to the solution, and the mixture is stirred for 48 hours at 25° C. Then, 1.97 grams of pyridine and 7.63 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Comparative Example 5

126 grams of N,N-dimethyl acetamide (DMAc) as a solvent is charged into a 4-neck double-walled 250 mL reactor, pre-heated to 25° C., and equipped with a mechanical stirrer and a nitrogen inlet, and 19.30 grams (0.0137 moles) of the 70 mol % of amide structural unit-containing oligomer prepared in Synthesis Example 1 is added thereto and dissolved. Then, 1.06 grams (0.0034 moles) of ODPA, 1.81 grams (0.0062 moles) of 3,3',4,4'-biphenyltetracarboxylic dianhydride (BPDA), and 1.82 grams (0.0041 moles) of 2,2-bis-(3,4-dicarboxyphenyl)hexafluoropropane dianhydride) (6FDA) are added to the solution, and the mixture is stirred for 48 hours at 25° C. Then, 1.62 grams of pyridine and 4.19 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

cal stirrer and a nitrogen inlet, and 13.96 grams (0.0094 moles) of the 70 mol % of amide structural unit-containing oligomer prepared in Synthesis Example 1 and 2.75 grams (0.008 moles) of TFDB are added thereto and dissolved. Then, 1.67 grams (0.005 moles) of ODPA, and 5.6 grams (0.012 moles) of 2,2-bis-(3,4-dicarboxyphenyl)hexafluoropropane dianhydride) (6FDA) are added to the solution, and the mixture is stirred for 48 hours at 25° C. Then, 2.14 grams of pyridine and 5.52 grams of acetic anhydride are added thereto, and the mixture is stirred for 24 hours to obtain a poly(amic acid-amide) copolymer solution, of which the solid content is 16 weight %.

After cooling down the poly(amic acid-amide) solution to a temperature of 25° C., the solution is casted on a glass substrate, and dried for 40 minutes on a hot plate at a temperature of 130° C. Then, the film is separated from the glass substrate and introduced into a furnace, wherein the temperature is increased from the room temperature to 227° C., at a heating rate of 10° C. per minutes, maintained at 277° C. for about 11 minutes, and slowly cooled to room temperature to obtain a poly(imide-amide) copolymer film.

Evaluation: Evaluation of mechanical and optical properties of the films

Each of the poly(imide-amide) copolymer films prepared in Examples 1 to 5 and Comparative Examples 1 to 6 are evaluated for mechanical properties and optical properties, and the obtained values are described in Table 1 below.

Particularly, the tensile modulus is measured by using an ASTM D882 method.

Yellowness index, light transmittance, and a YI difference (ΔYI) before and after exposure to UV light are measured to evaluate the optical properties. YI and light transmittance are measured for a film having a thickness of about 50 micrometers, according to an ASTM D1925 method by using a spectrophotometer, CM-3600d made by Konica Minolta Inc. YI difference (ΔYI) before and after exposure to UV light is measured for the YI difference before and after exposure to a ultraviolet (UV) lamp of a UVB wavelength region for 72 hours.

TABLE 1

| | Mole ratio = TPCI:ODPA:BPDA:6FDA:TFDB | Thickness [μm] | Tensile modulus [GPa] | YI@ 50 μm [—] | ΔYI | Transmittance [%] |
|---|---|---|---|---|---|---|
| Example 1 | 70:1.5:12:16.5:100 | 52 | 6.1 ± 0.1 | 2.30 | 0.62 | 88.69 |
| Example 2 | 70:3:10.5:16.5:100 | 48 | 5.9 ± 0.1 | 2.33 | 0.63 | 88.79 |
| Example 3 | 70:9:4.5:16.5:100 | 54 | 6.0 ± 0.1 | 2.0 | 0.88 | 88.97 |
| Example 4 | 70:13.5:0:16.5:100 | 55 | 5.9 ± 0.1 | 2.04 | 0.74 | 88.96 |
| Example 5 | 60:18.5:0:21.5:100 | 51 | 5.1 ± 0.1 | 2.12 | 0.8 | 89.16 |
| Comparative Example 1 | 45:33.5:0:21.5:100 | 47 | 4.7 ± 0.1 | 2.2 | 0.66 | 89.2 |
| Comparative Example 2 | 75:15:0:10:100 | | | Whiteness | | |
| Comparative Example 3 | 70:0:13.5:16.5:100 | 50 | 6.0 ± 0.1 | 2.5 | 0.76 | 88.66 |
| Comparative Example 4 | 53:37:0:10:100 | 50 | 4.8 ± 0.1 | 2.3 | 0.65 | 88.78 |
| Comparative Example 5 | 70:7.5:13.5:9:100 | 47 | 7.0 ± 0.1 | 6.9 | 1.6 | 86.8 |
| Comparative Example 6 | 55:13.5:0:1.5:100 | 44 | 4.5 ± 0.1 | 1.8 | 1.0 | 89.7 |

Comparative Example 6

126 grams of N,N-dimethyl acetamide (DMAc) as a solvent is charged into a 4-neck double-walled 250 mL reactor, pre-heated to 25° C., and equipped with a mechani- As shown in Table 1, the films prepared from the composition including ODPA in an amount of 1 to 35 mol % as an aromatic dianhydride, and TPCI in an amount of less than or equal to 70 mol % as an aromatic dicarbonyl compound, have high tensile moduli of greater than or equal to 5.0 GPa, and low yellowness index of less than 2.5, when the films have a thickness of 50 micrometers. This indicates that the films have improved optical properties, such as, low yellowness index, while maintaining good mechanical properties.

On the contrary, the film according to Comparative Example 2, which includes 75 mol % of TPCI, cannot be used as an optical film as whiteness occurs.

When the amount of TPCI is 45 mol % in Comparative Example 1, the film has tensile modulus of less than 5.0 GPa, showing that the mechanical properties of the film are deteriorated.

Further, both the film according to Comparative Example 4, which includes 53 mol % of TPCI and 35 mol % of ODPA, and the film according to Comparative Example 6, which includes 55 mol % of TPCI and 30 mol % of 6FDA, has tensile moduli of less than 5.0 GPA, showing that the mechanical properties of the film are deteriorated.

Meanwhile, the film according to Comparative Example 3, having the composition that is similar to that in Example 1, except for not including ODPA, shows that both the tensile modulus and YI are deteriorated compared to Example 1.

Further, the film according to Comparative Example 5, which includes less than 10 mol % of 6FDA, has YI of 6.9, showing that the optical properties of the film are deteriorated.

While this disclosure has been described in connection with what is presently considered to be practical exemplary embodiments, it is to be understood that the present disclosure is not limited to the embodiments presented herein, but, on the contrary, is intended to cover various modifications and equivalent arrangements included within the spirit and scope of the appended claims.

What is claimed is:

1. A poly(imide-amide) film having a tensile modulus of greater than or equal to about 5 gigapascals according to ASTM D882 method, and a yellowness index of less than or equal to 2.33 according to ASTM D1925 method by using a spectrophotometer, when measured at a thickness of the film between 50 micrometers to 100 micrometers, wherein the poly(imide-amide) film is a reaction product of a combination comprising an aromatic dianhydride represented by Chemical Formula 4, an aromatic diamine, and an aromatic dicarbonyl compound represented by Chemical Formula 3:

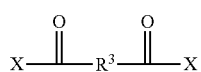

Chemical Formula 3 wherein, in Chemical Formula 3,
$R^3$ is a substituted or unsubstituted phenylene or biphenylene group, and
X is a halogen atom;

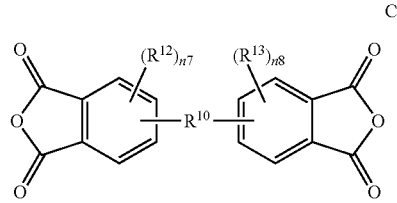

Chemical Formula 4 wherein, in Chemical Formula 4,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10 and 1≤q≤10,
$R^{12}$ and $R^{13}$ are each independently a halogen, hydroxy group, a substituted or unsubstituted C1 to C10 aliphatic organic group, a C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and
n7 and n8 are each independently an integer ranging from 0 to 3;
wherein the aromatic dianhydride represented by Chemical Formula 4 comprises 4,4'-oxydiphthalic anhydride and 2,2-bis-(3,4-dicarboxyphenyl) hexafluoropropane dianhydride), and
wherein the combination comprises 4,4'-oxydiphthalic anhydride in an amount of 1 mole percent to 35 mole percent, 2,2-bis-(3,4-dicarboxyphenyl) hexafluoropropane dianhydride) in an amount of 10 mole percent to 30 mole percent, and the aromatic dicarbonyl compound represented by Chemical Formula 3 in an amount of 51 mole percent to 70 mole percent based on the total amount of the aromatic dianhydride represented by Chemical Formula 4 and the aromatic dicarbonyl compound represented by Chemical Formula 3.

2. The poly(imide-amide) film according to claim 1, wherein the aromatic diamine is represented by Chemical Formula 2:

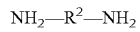

Chemical Formula 2 wherein, in Chemical Formula 2,
$R^2$ comprises a substituted or unsubstituted C6 to C30 aromatic organic group, wherein the C6 to C30 aromatic organic group comprises one aromatic ring, two or more aromatic rings fused together to provide a condensed ring system, or two or more aromatic moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, a substituted or unsubstituted C6 to C15 arylene group, and a combination thereof.

3. The poly(imide-amide) film according to claim 2, wherein in Chemical Formula 2, $R^2$ comprises substituted or unsubstituted two or more aromatic moieties linked through a single bond or a functional group selected from —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, and a combination thereof, and wherein the two or more aromatic moieties are substituted with at least one selected from —OH, —CF$_3$, —CCl$_3$, —CBr$_3$, —Cl$_3$, —NO$_2$, —CN, —COCH$_3$ and —CO$_2$C$_2$H$_5$.

4. The poly(imide-amide) film according to claim 2, wherein in Chemical Formula 2, $R^2$ comprises two or more phenylene groups linked through a single bond, wherein each of the two or more phenylene groups are substituted with at least one selected from —CF$_3$, —CCl$_3$, —CBr$_3$, —Cl$_3$, —NO$_2$, —CN, —COCH$_3$ and —CO$_2$C2H$_5$.

5. The poly(imide-amide) film according to claim 1, wherein the aromatic dianhydride represented by Chemical Formula 4 further comprises the compound represented by Chemical Formula 4 wherein R$^{10}$ is a single bond, and both n7 and n8 are 0.

6. The poly(imide-amide) film according to claim 1, wherein in Chemical Formula 3, R$^3$ is phenylene group, and X is Cl.

7. A display device comprising a poly(imide-amide) film according to claim 1.

8. The poly(imide-amide) film according to claim 1, wherein the 4,4'-oxydiphtalic anhydride is present in an amount of 1.5 mole percent to 18.5 mole percent, based on the total amount of the aromatic dianhydride represented by Chemical Formula 4 and the aromatic dicarbonyl compound represented by Chemical Formula 3.

9. A composition for preparing a poly(imide-amide) film, wherein the composition comprises an amide structural unit-containing diamine represented by Chemical Formula 5, and an aromatic dianhydride represented by Chemical Formula 4:

Chemical Formula 5

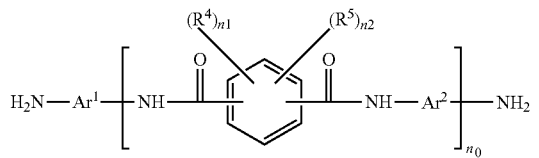

wherein, in Chemical Formula 5,
R$^4$ and R$^5$ are each independently a halogen, hydroxy group, a substituted or unsubstituted C1 to C10 alkyl group, or a substituted or unsubstituted C1 to C10 alkoxy group,
n0 is an integer greater than or equal to 1,
n1 and n2 are each independently an integer ranging from 0 to 4, provided that
n1+n2 is an integer ranging from 0 to 4, and
Ar$^1$ and Ar$^2$ are each independently represented by Chemical Formula 6:

Chemical Formula 6

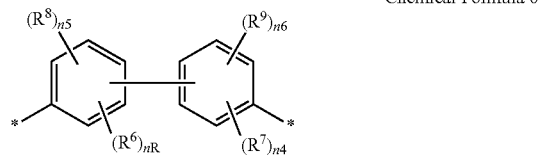

wherein, in Chemical Formula 6,
R$^6$ and R$^7$ are each independently an electron withdrawing group selected from —CF$_3$, —CCl$_3$, —CBr$_3$, —Cl$_3$, —NO$_2$, —CN, —C(=O)CH$_3$, and —CO$_2$C2H$_5$,
R$^8$ and R$^9$ are each independently a halogen, hydroxy group, a substituted or unsubstituted C1 to C10 aliphatic organic group, a C6 to C20 aromatic organic group, an alkoxy group of formula —OR$^{264}$, wherein R$^{204}$ is a C1 to C10 aliphatic organic group, or a silyl group of formula —SiR$^{205}$R$^{206}$R$^{207}$, wherein R$^{205}$, R$^{206}$, and R$^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4; and Chemical Formula 4

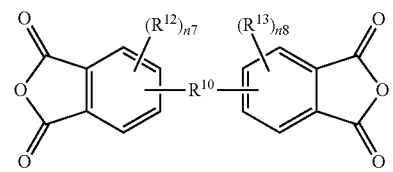

wherein, in Chemical Formula 4,
R$^{10}$ is a single bond, —O—, —S—, —C(=O)—, —CH(OH)—, —C(=O)NH—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, C(C$_n$F$_{2n+1}$)$_2$—, —(CH$_2$)$_p$ C(C$_n$H$_{2n+1}$)$_2$(CH$_2$)$_q$—, or —(CH$_2$)$_p$ C(C$_n$F$_{2n+1}$)$_2$(CH$_2$)$_q$— wherein 1≤n≤10, 1≤p≤10, and 1≤q≤10,
R$^{12}$ and R$^{13}$ are each independently a halogen, hydroxy group, a substituted or unsubstituted C1 to C10 aliphatic organic group, a C6 to C20 aromatic organic group, an alkoxy group of formula —OR$^{201}$, wherein R$^{201}$ is a C1 to C10 aliphatic organic group, or a silyl group of formula SiR$_{210}$R$^{211}$R$^{212}$, wherein R$^{210}$, R$^{211}$, and R$^{212}$ are each independently hydrogen or a C1 to C10 aliphatic organic group, and
n7 and n8 are each independently an integer ranging from 0 to 3;
wherein the aromatic dianhydride represented by Chemical Formula 4 comprises 4,4'-oxydiphtalic anhydride in an amount of 1 mole percent to 35 mole percent, and 2,2-bis-(3,4-dicarboxyphenyl)hexafluoropropane dianhydride in an amount of 10 mole percent to 30 mole percent based on the total mole number of the amide structural unit represented by n0 in the compound represented by Chemical Formula 5 and the aromatic dianhydride represented by Chemical Formula 4, and
wherein the composition comprises the amide structural unit represented by n0 in the compound represented by Chemical Formula 5 in an amount of 51 mole percent to 70 mole percent based on the total mole number of the amide structural unit represented by n0 in the compound represented by Chemical Formula 5 and the aromatic dianhydride represented by Chemical Formula 4.

10. The composition according to claim 9, wherein the composition further comprises a diamine represented by Chemical Formula 7:

H$_2$N—Ar$^3$—NH$_2$      Chemical Formula 7 wherein, in Chemical Formula 7, Ar$^3$ is represented by Chemical Formula 6:

Chemical Formula 6

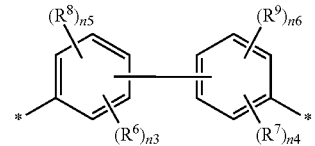

wherein, in Chemical Formula 6, $R^6$ and $R^7$ are each independently an electron withdrawing group selected from —$CF_3$, —$CCl_3$, —$CBr_3$, —$Cl_3$, —$NO_2$, —CN, —C(=O)$CH_3$, and —$CO_2C_2H_5$, $R^8$ and $R^9$ are each independently a halogen, hydroxy group, a substituted or unsubstituted C1 to C10 aliphatic organic group, a C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein $R^{205}$, $R^{206}$, and $R^{207}$ are each independently hydrogen or a C1 to C10 aliphatic organic group, n3 is an integer ranging from 1 to 4, n5 is an integer ranging from 0 to 3, provided that n3+n5 is an integer ranging from 1 to 4, and n4 is an integer ranging from 1 to 4, n6 is an integer ranging from 0 to 3, provided that n4+n6 is an integer ranging from 1 to 4.

11. The composition according to claim 9, wherein the 4,4'-oxydiphthalic anhydride is present in an amount of 1.5 mole percent to 18.5 mole percent, based on the total amount of the aromatic dianhydride represented by Chemical Formula 4 and the aromatic dicarbonyl compound represented by Chemical Formula 3.

* * * * *